United States Patent [19]

Schnell

[11] 4,359,141

[45] Nov. 16, 1982

[54] LUBRICATING SYSTEM

[76] Inventor: Horst Schnell, Donatusstrass 65, T. 19229, 4052 Korschenbroich 1, Fed. Rep. of Germany

[21] Appl. No.: 208,932

[22] Filed: Nov. 21, 1980

[51] Int. Cl.³ .................. F01M 11/02; F01M 11/08
[52] U.S. Cl. .................. 184/6.26; 55/418;
  55/465; 138/37; 138/42; 184/6.23; 184/7 R
[58] Field of Search .................. 184/6.26, 6.21, 6.23,
  184/6.77, 7 R, 56 R, 56 A; 55/462, 466, 418,
  465, 398; 138/42, 37

[56] References Cited

U.S. PATENT DOCUMENTS

| 896,479 | 8/1908 | Süssmann | 55/465 |
| 2,959,249 | 11/1960 | Gothberg et al. | 184/6.22 X |
| 3,631,655 | 1/1972 | Mullen | 55/418 X |
| 3,665,684 | 5/1972 | White | 184/56 R X |
| 3,834,493 | 9/1974 | Hubert | 184/626 X |
| 4,140,178 | 2/1979 | Ohlswager et al. | 55/465 X |

FOREIGN PATENT DOCUMENTS

| 966346 | 7/1957 | Fed. Rep. of Germany | 184/6.23 |
| 2844995 | 4/1980 | Fed. Rep. of Germany | 184/7 R |

Primary Examiner—David H. Brown
Attorney, Agent, or Firm—Joseph Zallen

[57] ABSTRACT

A distribution system for conducting a mixture of oil droplets and air to surfaces to be lubricated, comprising a main inward flow duct (1) connected to a source of oil droplets dispersed in air, and at least one distributor unit (2) connected to said inlet duct; said distributor unit including a baffle means containing at least two alternately and symmetrically spaced groups of conduits connecting with said inlet duct; each said groups of conduits leading to a separate outlet channel.

6 Claims, 3 Drawing Figures

LUBRICATING SYSTEM

BACKGROUND OF INVENTION

This invention relates to a distribution system utilizing oil droplets dispersed in air for lubricating bearing surfaces as for example roller bearings, sliding surfaces, gears, slideways, chains or similar mechanisms. In particular it relates to a distributor system which is not dependent on gravity and reduces oil omissions into the atmosphere.

The prior art on lubrication systems is primarily concerned with conveying oil in the form of a mist and precipitating the oil from the mist near the bearing to be lubricated. Although oil mist lubricators reduce the amount of oil consumption there is a loss through the bearing seals to the atmosphere. Gothberg, et al, U.S. Pat. No. 2,959,249 places local constrictors so as to change the oil mist to a mixture of fluid oil and air by precipitation. A precipitating nipple is used so that the amounts of oil precipitated can be changed as required by the bearings. A substantially high flow of the oil mist is directed against a transverse stationary surface to accomplish precipitation.

White, U.S. Pat. No. 3,665,684 is concerned with reclassifying micro particles of oil from an oil mist to substantially eliminate air pollution by such particles by use of a vacuum tank and pump and filter unit.

Malone, U.S. Pat. No. 2,334,942 is basically concerned with generating a continuous flow of oil mist, preferable bubbling air or other gas through a body of the lubricant.

The surface tension of atomized microfine oil particles is larger than the attraction force of the oil particles, so that the microfine atomized oil is in a state which is comparable to a gaseous condition of aggregation. The microfine atomized oil is in that state when conducted from the central atomizing appliance to the different friction points and is recondensed in corresponding nozzles in a manner as to form the droplet oil liquid.

One drawback of this oil spray system is that it is not possible to bring the oil spray completely back to the drop-like state.

The remaining oil spray can thus cause an environmental pollution with environmental damages. Furthermore, atomized oil spray can be transported only at very small distances, since the microfine atomized aggregation condition of oil is maintained only as long as the streaming remains laminary. When the streaming becomes turbulent, the oil particles are propelled against each other to unite and form big oil drops. In such a state no distribution is possible and the oil flows back to the container tank. The necessary small streaming velocity should be smaller than the critical streaming velocity corresponding to the Reynold's number, which necessitates relatively important cross-sections of conduits.

In oil dispersed in a turbulent air stream, the action of gravity provokes accumulation of the major part of the lubricant at the lowest points of the distributing apparatus so that distribution becomes dependent on location, which, for example in the case of vehicles lubricating systems can have negative consequences. Distributing devices with movable parts have proven impractical. Separate air cyclones are likewise impractical since the viscosity of lubricants varies within very wide limits. Lubricants, because of their widely variable viscosities, are not compatible and the ratio between the air and the oil quantity varies depending on necessity. Location plays a corresponding part. Thus it is accepted practice in a lubricating system of a mixture of oil and air to add oil to the air stream in a quantity corresponding to the location of each separate friction point.

One object of the present invention is to provide a novel distributor system for oil-air lubrication free of oil mist and having improved efficiency.

Another object of this invention is to provide such a system which is essentially independent of gravity so as to be effective regardless of the spacial orientation of the distributor mechanism.

Further objects and advantages of this invention will be apparent from the description and claims which follow taken together with the appended drawings.

SUMMARY OF INVENTION

The lubricating system of the present invention comprises essentially utilizing lubricant held in the form of droplets in a carrier medium and dividing such lubricant into at least two separate outlet streams. The inward stream is broken up into a plurality of intermediate currents with one group of intermediate currents discharging into each of the outlet streams. Each group of intermediate currents is alternated or interlaced with the other group to compensate for the gravitational force. In a preferred form the inward stream is received by two groups of intermediate current ducts radially arranged with every second intermediate duct discharging into one outward stream, the other ducts into a second outward stream.

One feature of this invention is subdivision of the lubricant between the inlet stream and the outlet streams in a plurality of intermediate streams. With subdivision of an inlet stream into two outlet streams the inlet stream can, for example, be first subdivided into eight intermediate streams, four of which are recombined into one outlet and the other four into a second outlet stream. Thus, each time two of the intermediate streams penetrate at the bottom of the inlet channel, two other pairs of intermediate streams penetrate at two opposite side walls of the inlet channel, and the fourth two intermediate streams penetrate at the top side of the same. The intermediate streams branch off therefore in four different directions namely, in the bottom, at the two opposite side walls and at the top. Then an intermediate stream from the bottom, from the opposite sides and from the top are conducted together into one outlet stream, while the four remaining intermediate streams are conducted to another outlet stream. In this manner each outlet stream is connected to four intermediate streams, with different spatial directions of preference, at the passage points from the inlet stream and the intermediate streams. Distribution becomes independent of position, because the gravity acts on the oil drops in the same manner in each position.

The invention is not limited to the above described example; a subdivision with more than two outlet channels is possible, and a substantially larger number of intermediate streams can be used than has been described.

Movable parts are unnecessary. A further advantage in this system is that the ratio between the carrier and the lubricant remains constant. Moreover, the invention is independent of the viscosity of the lubricant. It can be used throughout the wide span from the thinnest to the highly viscous lubricants.

Further, the lubricant, for example, the oil remains liquid, when sprayed onto the bearings. There is thus no oil mist and the process is therefore environmentally clean. Moreover, the ratio of carrier-lubricant can be adjusted according to the necessities at the central lubricating station. In comparison with the mist oil system, higher transportation velocities, can be used which result in smaller cross-sections of conduits. As compared with distribution systems including movable parts, the procedure according to the invention operates without wear.

Another characteristic of the invention is provision that the outlet channels have different cross-sections. Still another feature of the invention is that the openings of the intermediate channels in the inlet channel are uniformly distributed in a radial manner about an imaginary middle axis of the channel, and that adjacent intermediate channels are connected to different outlets. The fact that the outflow ducts may be provided with throttle adjustments may be regarded as a further distinguishing characteristic of the invention. By means of these throttle adjustments, various different arrangements may be made for the distribution of flow. If, for example, the throttle is in the form of a diaphragm and the diaphragm openings are of equal size, the flow is divided equally. However, if the openings are of different sizes, the proportional division of the flow varies directly as the ratios of the cross-sectional areas of the openings to one another.

It may be regarded as a further distinguishing characteristic of the invention that the inflow duct has internal denticulation, the intermediate ducts being formed by the insertion into the inflow duct of toothed wheels with a number of teeth different from that of the internal denticulation. The gaps thus formed and distributed around the entire circumference of the denticulate area create the intermediate ducts, which then are linked in groups with the outflow ducts.

SPECIFIC EXAMPLES OF INVENTION

Figure 1:
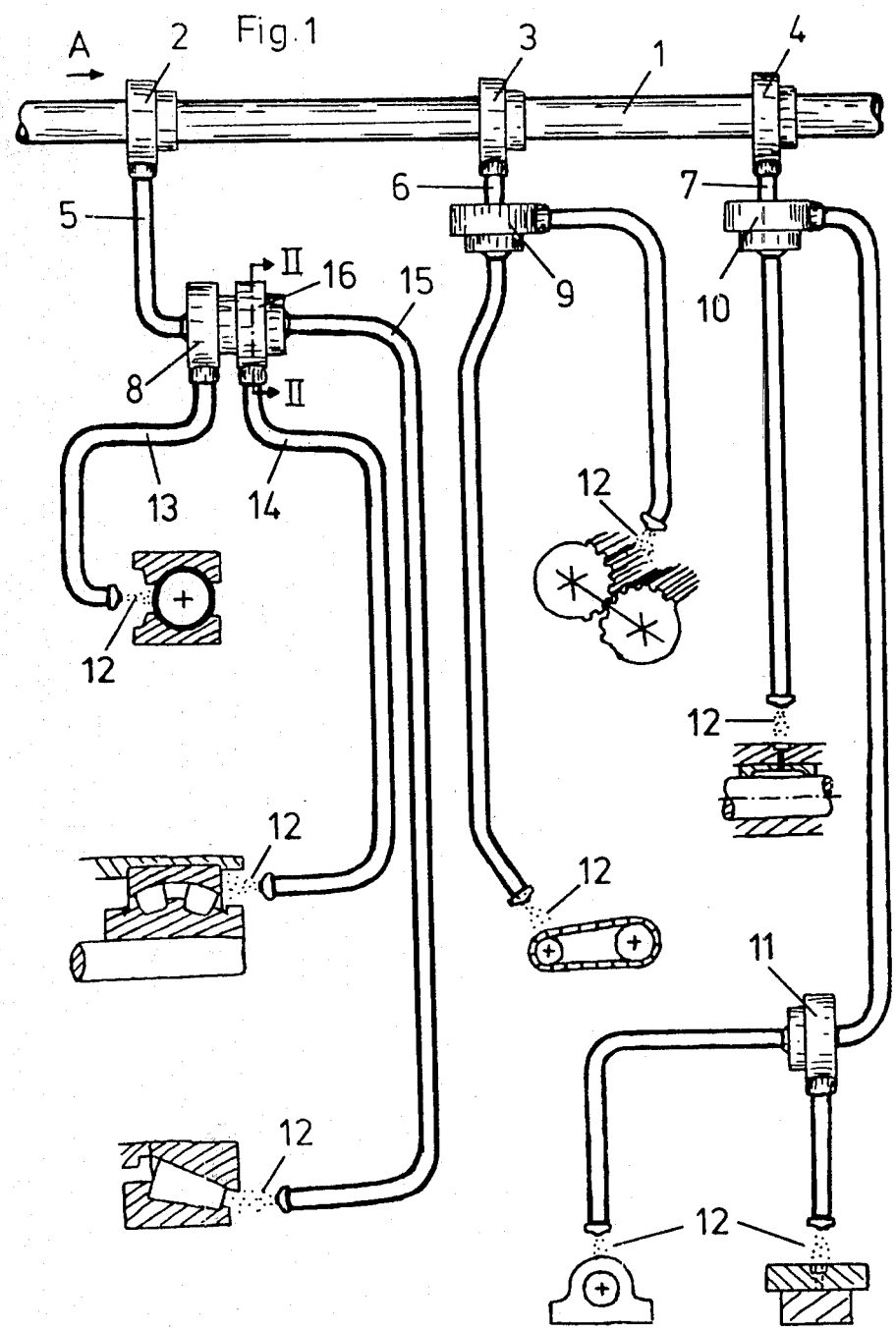
FIG. 1 is a schematic description of a number of distributors connected together.

Referring now to the drawings, there is illustrated therein a distributor system made in accordance with this invention. From a central mechanism (not shown), an air-oil mix in which the oil is held in the form of droplets rather than in a fine mist is introduced in a turbulent air current through duct 1 in the direction of arrow A. Duct 1 has several distributors (2, 3, 4 . . . ) attached, to which branch ducts 5, 6 and 7 are connected. Further distributors (8, 16, 9, 10, 11) are connected to the branch ducts. From these distributors, the air-oil mix, designated as 12, is conveyed to friction and lubrication points, which may be roller beds, slideways, sliding surfaces, gears, chains or similar mechanisms, and which same are shown schematically on FIG. 1. The branch ducts leading to friction points are designated with No. 13, as to those leading from distributor 8; and Nos. 14 and 15, as to those leading from distributor 16.

Figure 3:
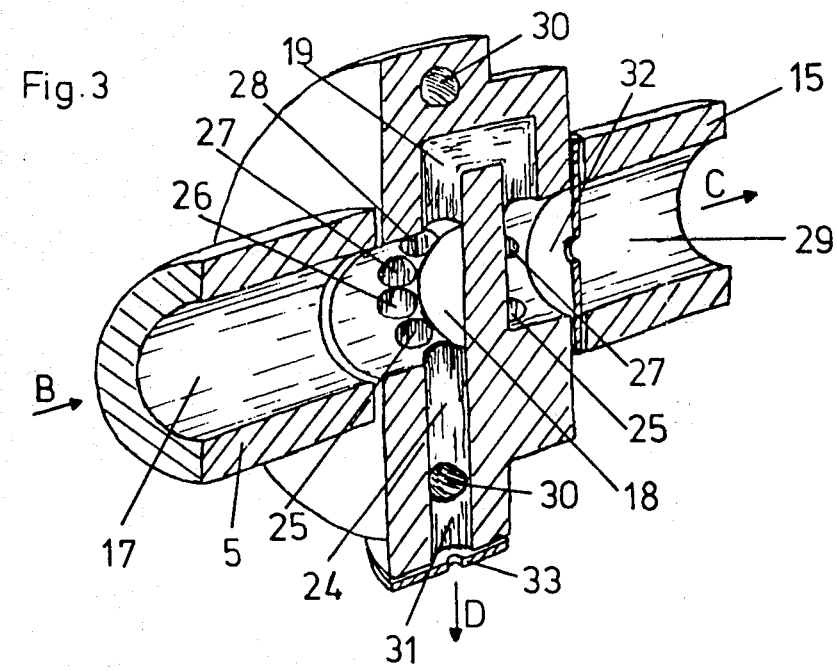
FIG. 3 is a cross sectional drawing corresponding to line III—III in FIG. 2.
Figure 2:
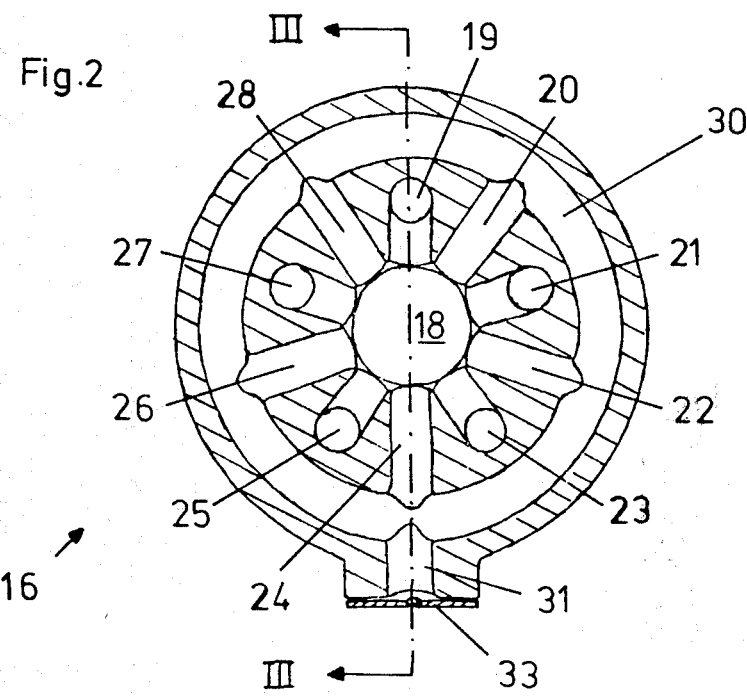
FIG. 2 is a large-scale cross section of a distributor corresponding to line II—II in FIG. 1.

Distributor 16 is shown schematically on an enlarged scale on FIGS. 2 and 3, and described in detail below.

Duct 5 forms internally an inflow channel, designated 17, for inflow of oil droplets in a turbulent air current in the direction of arrow B. Inward flow stream duct 17 is closed off by gear 18. Around the internal circumference of duct 17, a total of 10 intermediate ducts are distributed radially; these are numbered 19–28. Ducts 19, 21, 23, 25 and 27 lead together into outflow duct 29, through which the air-oil mixture is conveyed to the friction point in the direction of arrow C. The ducts interspersed between those identified above, namely 20, 22, 24, 26 and 28, lead into a ring-shaped duct numbered 30, which subsequently leads into duct 31, from which the air-oil mixture exits in the direction of arrow D. Even in the event that because of gravitational force a majority of the oil droplets in inflow B concenrate in the lower part of the inward flow stream duct, the flow is nevertheless divided equally between outward flow streams C and D, since both streams are fed by the same number of intermediate ducts having equivalent positional advantages. A change in the spatial orientation of the distributor does not affect this distribution. Thus, the influence of gravity on distribution in the event of a change in spatial orientation is more effectively precluded as the number of intermediate ducts is increased. Outward flow stream ducts 29 and 31 are provided with throttle adjustments 32 and 33, respectively, which adjustments allow changes to be made in the cross-sectional area of the outflow ducts. This makes possible a wide range of variations in the distribution arrangement. If, for example, a throttle opening has a radius of 0.1 mm, the equivalent cross-sectional area is 0.0314 mm$^2$. If the throttle opening in another outward flow stream channel measures 0.2 mm, the equivalent cross-sectional area is 0.1256 mm$^2$ or 4 times the cross-sectional area of the other channel (assuming that, unlike those shown on the drawings, the cross-sectional areas of the outlfow ducts are of equal size). An aperture radius of 1 mm gives 100 times the cross-sectional area of a radius of 0.1 mm.

Naturally, it is also possible to use the carrier medium simultaneously as a working medium.

I claim:

1. A distribution system for conducting a mixture of oil droplets and air to surfaces to be lubricated, comprising a main inward flow duct (1) connected to a source of oil droplets dispersed in air, and at least one distributor unit (2) connected to said inlet duct; said distributor unit including a baffle means containing at least two alternately and symmetrically spaced groups of conduits connecting with said inlet duct; each said groups of conduits leading to a separate outlet channel.

2. The distributor unit of claim 1 wherein said groups of conduits are radially arranged transversely across said inlet duct.

3. The distributor unit of claim 1 wherein means are provided for reducing the effective cross-section of the outlet ducts.

4. The distributor unit of claim 2 wherein one outlet duct is aligned with said inlet duct and one outlet duct is perpendicular to said inlet duct.

5. The distributor system of claim 1 wherein there are a plurality of distributor units along the inlet duct and each distributor unit has a transverse outlet duct, with the result that the air-oil mixture flows through the main duct and also through the perpendicular ducts.

6. The distribution system of claim 5 wherein at least one transverse outlet duct is the inlet duct for another distributor unit.

* * * * *